(12) United States Patent
Watanabe

(10) Patent No.: US 6,738,212 B2
(45) Date of Patent: May 18, 2004

(54) INFORMATION PROCESSING APPARATUS, INFORMATION PROCESSING METHOD AND INFORMATION RECORDING MEDIUM IN WHICH PROGRAM FOR INFORMATION PROCESSING IS RECORDED CAPABLE OF BEING READ

(75) Inventor: Tomo Watanabe, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 249 days.

(21) Appl. No.: 10/025,810

(22) Filed: Dec. 26, 2001

(65) Prior Publication Data

US 2002/0085301 A1 Jul. 4, 2002

(30) Foreign Application Priority Data

Dec. 28, 2000 (JP) .................................... P2000-400524
Dec. 28, 2000 (JP) .................................... P2000-400525

(51) Int. Cl.$^7$ ............................................. G11B 15/18
(52) U.S. Cl. ......................................................... 360/69
(58) Field of Search ............................ 360/69, 53, 13, 360/57, 75, 55; 700/214; 710/8, 302; 711/4, 156, 162

(56) References Cited

U.S. PATENT DOCUMENTS

| | | | | |
|---|---|---|---|---|
| 5,982,301 A | * | 11/1999 | Ohta et al. ............... | 340/995.2 |
| 6,016,518 A | * | 1/2000 | Matsushima et al. .......... | 710/8 |
| 6,038,624 A | * | 3/2000 | Chan et al. ................. | 710/302 |
| 6,600,967 B2 | * | 7/2003 | Milligan et al. ............ | 700/214 |
| 6,639,746 B1 | * | 10/2003 | Chung et al. ................ | 360/55 |
| 6,643,086 B1 | * | 11/2003 | Hiramoto et al. ............. | 360/69 |
| 6,661,597 B1 | * | 12/2003 | Codilian et al. .............. | 360/75 |

* cited by examiner

Primary Examiner—David Hudspeth
Assistant Examiner—Fred F. Tzeng
(74) Attorney, Agent, or Firm—Morgan, Lewis & Bockius LLP

(57) ABSTRACT

A navigation equipment for performing the navigation processing by the use of the information from a plurality of hard disk recording and reproducing units which is provided with: a hard disk recording and reproducing unit including a hard disk, in which the map information or the like to be used for the navigation processing and be planned to be updated and additional information corresponding to the navigation processing by the use of this map information or the like are recorded; and a system controlling unit, which detects whether a second hard disk recording and reproducing unit is connected or not and releases an area, in which the map information or the like in the hard disk recording and reproducing unit is recorded, if the connection of the present second hard disk recording and reproducing unit is detected.

24 Claims, 4 Drawing Sheets

INFORMATION PROCESSING APPARATUS, INFORMATION PROCESSING METHOD AND INFORMATION RECORDING MEDIUM IN WHICH PROGRAM FOR INFORMATION PROCESSING IS RECORDED CAPABLE OF BEING READ

BACKGROUND OF THE INVENTION

1. Field of the Invention

The present invention relates to a technical art of an information processing apparatus, an information processing method and an information recording medium in which a program for information processing is recorded capable of being read by a computer. More particularly, the present invention relates to a technical art of an information processing apparatus and method for processing the information as giving and receiving the information between a plurality of recording mediums, and an information recording medium in which a processing information program for performing the foregoing information processing is recorded capable of being read.

2. Description of the Related Art

Conventionally, for example, an information processing apparatus such as a navigation equipment or the like to facilitate the movement of a vehicle is configured so that it performs the information processing such as a navigation processing or the like, which is predetermined for each type of this information processing apparatus by using information such as map information, which is recorded in a recording medium such as an optical disk or the like.

In the above described navigation equipment or the like, a read-only optical disk has been normally used as its recording medium. However, due to multi-function of these navigation equipments or the like in recent years, it has been often required that a user write the information which he/she desires on the optical disk. For example, he/she desires to write the music information or the like he/she desires to listen to, which is not related to the navigation processing, on the optical disk in addition to some information necessary for the navigation processing.

Alternatively, according to the conventional optical disk, after moving a pick up for detecting to a position on the optical disk where the desired information is recorded, it takes a certain time until detecting is started. Therefore, it has been required that a recording medium permits higher speed detecting of the desired information to quickly acquire the information while the vehicle is moving at high speed.

Consequently, in recent years, as a recording medium included in a navigation equipment, the study of the usage of a hard disk, which has large capacity storage capable of writing the information and retrieving the information at high speed, is becoming actively.

In this case, there are generally a lot of cases where the hard disks not less than two are connected to one navigation equipment or the like and the navigation processing or the like is performed while mutually identifying these hard disks to give and receive the information.

As the above described information which the user desires to record on the recording medium, concretely, for example, which is associated with the execution of the navigation processing, a position of a particular point where the user often visits, a passage to this particular point or a status of waiting at traffic lights (i.e., switching timing) on a road which the user frequently uses, are considered.

On the other hand, as the information which has been recorded originally in the recording medium other than the above described information which the user desires to record, for example, road information indicating the arrangement of roads, a name of an intersection on a road or map information or the like including one-way traffic information or the like are considered. However, it can be perceived that particularly, the road information, the name of the intersection or the like among these information are scheduled to be updated in accordance with new road improvement or the like.

As a method for updating these information, various methods can be considered. However, generally, it is a simple and reliable method that a navigation equipment is configured capable of being connected to a plurality of recording mediums, the necessary navigation processing or the like is used by the use of one recording medium, in which the original map information or the like is recorded, among these plural recording mediums, a connection portion to connect other recording medium is made an empty status (namely, a status that other recording medium is not connected), a new recording medium, in which the map information or the like after being updated is recorded, is loaded in the present empty connection portion upon updating the map information or the like, and after the loading, the map information or the like after being updated is used to perform the necessary navigation processing.

If this point is applied to a navigation equipment to use a hard disk as the recording medium, the navigation system is configured capable of connecting a plurality of hard disks with being replaceable. Then, the normal navigation processing or the like is performed by the use of one recording medium, in which the original map information or the like is recorded, among these plural recording mediums, and a new hard disk, in which the map information or the like after being updated is recorded, is loaded in the present empty connection portion upon updating the map information or the like.

In this case, after loading the present new hard disk, since the hard disk, in which the map information before updating is recorded, has no meaning to record the map information, it is desirable that this map information before updating is deleted and this hard disk is newly released as an empty area which is capable of being freely used (i.e., capable of recording and reproducing the information freely).

As another method, it is considered that a navigation equipment is configured capable of connecting a plurality of recording mediums and one recording medium, in which the original map information or the like has been recorded, among these plural recording mediums, is replaced with a new recording medium, in which the map information or the like after updating is recorded, so that the updating is performed.

Then, if this point is applied to a navigation equipment to use a hard disk as the recording medium, the navigation system is configured capable of connecting a plurality of hard disks with being replaceable, so that one recording medium, in which the original map information or the like is recorded, among these plural recording mediums is entirely replaced with a new hard disk, in which the map information or the like after being updated is recorded.

However, in order to make a hard disk, in which the map information or the like before updating is recorded, an empty area capable of being freely used as described above, if a conventional method is used, it becomes necessary that the user himself or herself operates the hard disk to release the entirety thereof.

In this case, since the conventional hard disk has some gigabytes of a recording capacity, if the entirety of the hard disk is released, it is needed to initialize the entirety thereof. Therefore, this involves a problem such that it takes an unnecessary time and unnecessary labor.

Further, as a result, this problem will be related to a problem such that convenience as a navigation equipment is deteriorated.

In addition, as described above, in the case of recording the information, which is made by the user from the point of the quick retrieval or the like, is recorded in a hard disk, in which the map information or the like is recorded, together with the present map information, there has been a problem such that the information made by the user is lost as well as the hard disk is replaced.

Further, in the case that the amount of the information made by the user is large, there has been a problem such that labor to copy the information in a new hard disk to be updated upon replacing the hard disk becomes large.

Furthermore, as a result, these problems will be related to a problem such that the navigation processing by the use of the map information after being updated is not capable of being started.

SUMMARY OF THE INVENTION

The present invention has been achieved in order to solve the above problems. It is an object of the present invention to provide an information processing apparatus and method capable of improving convenience as a navigation equipment as the result of releasing an unnecessary hard disk without imposing a burden on a user and an information recording medium in which a program for information processing is recorded capable of being recorded by a computer.

Alternatively, another object of the present invention is to provide an information processing apparatus capable of capable of immediately starting the information processing without erasing the additionally made information or without newly making the information even after the specific information such as the map information or the like has been updated.

The above object of the present invention can be achieved by an information processing apparatus of the present invention, which is capable of connecting the both of a first recording medium and a second recording medium. The first recording medium is provided with a first recording area and a second recording area. The second recording medium is provided with a third recording area and a fourth recording area. In the first recording area, specific information to be used for information processing is recorded and the specific information is not capable of being erased under a predetermined condition. The second recording area is capable of recording the information on the basis of a user's instruction. In the third recording area, update specific information used for the information processing and obtained by updating the specific information is recorded and the update specific information is not capable of being erased under a predetermined condition. The fourth recording area is capable of recording the information on the basis of a user's instruction. The information processing apparatus is provided with: a connection detecting device for detecting whether the second recording medium is connected to the information processing apparatus or not while the first recording medium has been connected to the information processing apparatus; and a releasing device for allowing the specific information recorded in the first recording area to be erased at preset timing after it is detected that the second recording medium is connected, and for releasing the first recording area as an empty area after the specific information is erased.

According to the present invention, when the connection of the second recording medium is detected, the first recording area is released as an empty area, so that it is possible to record or reproduce other information in the first recording medium without imposing a burden on a user. Accordingly, it is possible to improve convenience in the information processing apparatus, which performs the information processing by the use of the information recorded in a plurality of recording mediums.

In one aspect of the present invention, the information processing apparatus is further provided with a forming device for forming the same information as the information recorded in the second recording area, in the fourth recording area. Further, the forming device starts the operation to form the same information in the fourth recording area when it is detected that the second recording medium is connected. Moreover, the releasing device starts the operation to release the first recording area after the specific information is erased as an empty area after the operation to form the same information is completed.

According to this aspect, when the same information as the information recorded in the second recording area has been completely formed in the fourth recording area, namely, after the present information is completely replaced, the processing is started to release the first recording area after erasing the specific information as an empty area. Therefore, the information recorded in the second recording area is not erased by mistake.

In another aspect of the present invention, the specific information relates to the navigation processing to facilitate the movement of a movable body.

According to this aspect, since the specific information relates to the navigation processing, in the information processing apparatus capable of performing the navigation processing, it is possible to record or reproduce other information in the first recording medium without imposing a burden on a user.

In further aspect of the present invention, the information processing apparatus is further provided with a start setting device which sets the information processing after the connection to be started by the use of the update specific information, which is recorded in the second recording medium, when it is detected that the second recording medium is connected.

According to this aspect, when the connection of the second recording medium is detected, the information processing after the connection is set to be started by the use of the update specific information, which has been recorded in the present second recording medium, so that it is possible to immediately start the information processing by the use of the update specific information.

The above object of the present invention can be achieved by an information recording medium of the present invention. In the information recording medium, a program for information processing is recorded capable of being read by a computer. The computer is included in an information processing apparatus capable of connecting the both of a first recording medium and a second recording medium. The first recording medium is provided with a first recording area and a second recording area. The second recording medium is provided with a third recording area and a fourth recording area. In the first recording area, specific information to be used for information processing is recorded and the specific information is not capable of being erased under a predetermined condition. The second recording area is capable of recording the information on the basis of a user's instruction. In the third recording area, update specific information used for the information processing and obtained by updating the specific information is recorded and the update specific information is not capable of being erased under a predetermined condition. The fourth recording area is capable of recording the information on the basis of a user's instruction. The program causes said computer to function as: a connection detecting device for detecting whether the second recording medium is connected to the information processing apparatus or not while the first recording medium has been connected to the information processing apparatus; and a releasing device for allowing the specific information recorded in the first recording area to be erased at preset timing after it is detected that the second recording medium is connected, and for releasing the first recording area as an empty area after the specific information is erased.

According to the present invention, when the computer is functioned so as to release the first recording area as an empty area, so that it is possible to record or reproduce other information in the first recording medium without imposing a burden on a user.

In one aspect of the present invention, the program further causes the computer to function as a forming device for forming the same information as the information recorded in the second recording area, in the fourth recording area. Further, the forming device starts the operation to form the same information in the fourth recording area when it is detected that the second recording medium is connected. Moreover, the releasing device starts the operation to release the first recording area after the specific information is erased as an empty area after the operation to form the same information is completed.

According to this aspect, when the same information as the information recorded in the second recording area has been completely formed in the fourth recording area, namely, after the present information is completely replaced, the computer is functioned so as to start the processing for releasing the first recording area after erasing the specific information as an empty area, so that the information recorded in the second recording area is erased by mistake.

In another aspect of the present invention, the specific information relates to the navigation processing to facilitate the movement of a movable body.

According to this aspect, the specific information relates to the navigation processing, so that it is possible to record or reproduce other information in the first recording medium without imposing a burden on a user.

In further aspect of the present invention, the program further causes the computer to function as a start setting device which sets the information processing after the connection to be started by the use of the update specific information, which is recorded in the second recording medium, when it is detected that the second recording medium is connected.

According to this aspect, when the connection of the second recording medium is detected, a computer is functioned so as to set the information processing after the connection to start by the use of the update specific information, which has been recorded in the present second recording medium, so that it is possible to start the information processing immediately by the use of the update specific information.

The above object of the present invention can be achieved by an information processing method of the present invention for performing information processing in an information processing apparatus. The information processing apparatus is capable of connecting the both of a first recording medium and a second recording medium. The first recording medium is provided with a first recording area and a second recording area. The second recording medium is provided with a third recording area and a fourth recording area. In the first recording area, specific information to be used for information processing is recorded and the specific information is not capable of being erased under a predetermined condition. The second recording area is capable of recording the information on the basis of a user's instruction. In the third recording area, update specific information used for the information processing and obtained by updating the specific information is recorded and the update specific information is not capable of being erased under a predetermined condition. The fourth recording area is capable of recording the information on the basis of a user's instruction. The information processing method is provided with the processes of: detecting whether the second recording medium is connected to the information processing apparatus or not while the first recording medium has been connected to the information processing apparatus;

allowing the specific information recorded in the first recording area to be erased at preset timing after it is detected that the second recording medium is connected; and releasing the first recording area as an empty area after the specific information is erased.

According to the present invention, when the connection of the second recording medium is detected, the first recording area is released as an empty area, so that it is possible to record or reproduce other information in the first recording medium without imposing a burden on a user. Accordingly, it is possible to improve convenience in the information processing apparatus, which performs the information processing by the use of the information recorded in a plurality of recording mediums.

In one aspect of the present invention, the information processing method is further provided with the process of forming the same information as the information recorded in the second recording area, in the fourth recording area. Further, the process of forming the same information starts the operation to form the same information in the fourth recording area when it is detected that the second recording medium is connected. Moreover, the process of releasing the first recording area starts the operation to release the first recording area after the specific information is erased as an empty area after the operation to form the same information is completed.

According to this aspect, when the same information as the information recorded in the second recording area has been completely formed in the fourth recording area, namely, after the present information is completely replaced, the processing is started to release the first recording area after erasing the specific information as an empty area. Therefore, the information recorded in the second recording area is not erased by mistake.

In another aspect of the present invention, the specific information relates to the navigation processing to facilitate the movement of a movable body.

According to this aspect, since the specific information relates to the navigation processing, in the information processing apparatus capable of performing the navigation processing, it is possible to record or reproduce other information in the first recording medium without imposing a burden on a user.

In further aspect of the present invention, the information processing method is further provided with the process of setting the information processing after the connection to be started by the use of the update specific information, which is recorded in the second recording medium, when it is detected that the second recording medium is connected.

According to this aspect, when the connection of the second recording medium is detected, the information processing after the connection is set to be started by the use of the update specific information, which has been recorded in the present second recording medium, so that it is possible to immediately start the information processing by the use of the update specific information.

The above object of the present invention can be achieved by an information processing apparatus of the present invention. The information processing apparatus is capable of connecting the both of a first recording medium and a second recording medium. The first recording medium is provided with a first recording area and a second recording area. The second recording medium is provided with at least a third recording area. In the first recording area, specific information to be used for information processing is recorded. The second recording area is capable of recording the information on the basis of a user's instruction. The third recording area is capable of recording the information on the basis of a user's instruction. The information processing apparatus is provided with: a connection detecting device for detecting whether the second recording medium is connected to the information processing apparatus or not while the first recording medium has been connected to the information processing apparatus; and a forming device for forming the same information as the information recorded in the second recording area, in the third recording area at preset timing after it is detected that the second recording medium is connected.

According to the present invention, when the connection of the second recording medium is detected, the same information as the information, which has been recorded in the foregoing second recording area, is formed in the fourth recording area, namely, the information, which has been recorded in the foregoing second recording area, is replaced, so that it is possible to update the present specific information without losing the information, which has been recorded in the second recording area to be used after the update, even if the first recording medium, in which the specific information is recorded at present, is cleared away in order to update the present specific information and it is replaced with a new recording medium. Accordingly, for example, even after the specific information is updated, it is possible to immediately start the information processing without losing the information that has been made or without newly making the information.

In one aspect of the present invention, the forming device starts the operation to form the information the same information in the third recording area when it is detected that the second recording medium is connected.

According to this aspect, when the connection of the second recording medium is detected, the operation to form the same information as the information, which has been recorded in the foregoing second recording area, in the fourth recording area, is started, so that it is possible to start the information processing by the use of the formed information after the information, which has been recorded in the second recording area, is replaced.

In another aspect of the present invention, the specific information relates to the navigation processing to facilitate the movement of a movable body.

According to this aspect, the specific information relates to the navigation processing, so that it is possible to perform the navigation processing without losing the information, which has been recorded in the second recording area.

In further aspect of the present invention, the second recording medium is further provided with a fourth recording area, in which the update specific information obtained by updating the specific information on the first recording medium is recorded. Further, the information processing apparatus is further provided with a start setting device which sets the information processing after the connection to be started by the use of the update specific information, which is recorded in the second recording medium, when it is detected that the second recording medium is connected.

According to this aspect, when the connection of the second recording medium is detected, the information processing after the connection is set to be started by the use of the update specific information, which has been recorded in the present second recording medium, so that it is possible to immediately start the information processing by the use of the update specific information.

The above object of the present invention can be achieved by an information recording medium of the present invention. In the information recording medium, a program for information processing is recorded capable of being read by a computer. The computer is included in an information processing apparatus capable of connecting the both of a first recording medium and a second recording medium. The first recording medium is provided with a first recording area and a second recording area. The second recording medium is provided with at least a third recording area. In the first recording area, specific information to be used for information processing is recorded. The second recording area is capable of recording the information on the basis of a user's instruction. The third recording area is capable of recording the information on the basis of a user's instruction. The program causes the computer to function as:

a connection detecting device for detecting whether the second recording medium is connected to the information processing apparatus or not while the first recording medium has been connected to the information processing apparatus; and a forming device for forming the same information as the information recorded in the second recording area, in the third recording area at preset timing after it is detected that the second recording medium is connected.

According to the present invention, when the connection of the second recording medium is detected, a computer is functioned so as to form the same information as the information, which has been recorded in the foregoing second recording area, in the fourth recording area, namely, a computer is functioned so as to replace the information, which has been recorded in the foregoing second recording area, so that it is possible to update the present specific information without losing the information, which has been recorded in the second recording area to be used after the update, even if the first recording medium, in which the specific information is recorded at present, is cleared away in order to update the present specific information and it is replaced with a new recording medium.

In one aspect of the present invention, the forming device starts the operation to form the information the same information in the third recording area when it is detected that the second recording medium is connected.

According to this aspect, when the connection of the second recording medium is detected, a computer is functioned so as to start the operation to form the same information as the information, which has been recorded in the foregoing second recording area, in the fourth recording area, so that it is possible to immediately start the information processing by the use of the formed information after the information, which has been recorded in the second recording area, is replaced.

In one aspect of the present invention, the specific information relates to the navigation processing to facilitate the movement of a movable body.

According to this aspect, the specific information relates to the navigation information, it is possible to perform the navigation processing without losing the information, which has been recorded in the second recording area.

In another aspect of the present invention, the second recording medium is provided with a fourth recording area, in which the update specific information obtained by updating the specific information on the first recording medium is recorded. Further, the program further causes the computer to function as a start setting device which sets the information processing after the connection to be started by the use of the update specific information, which is recorded in the second recording medium, when it is detected that the second recording medium is connected.

According to this aspect, when the connection of the second recording medium is detected, a computer is functioned so as to set the information processing to be started by the use of the update specific information, which has been recorded in the present second recording medium, so that it is possible to immediately start the information processing by the use of the update specific information.

The above object of the present invention can be achieved by an information processing method of the present invention for performing information processing in an information processing apparatus capable of connecting the both of a first recording medium and a second recording medium. The first recording medium is provided with a first recording area and a second recording area. The second recording medium is provided with at least a third recording area. In the first recording area, specific information to be used for information processing is recorded. The second recording area is capable of recording the information on the basis of a user's instruction. The third recording area is capable of recording the information on the basis of a user's instruction. The information processing method is provided with the processes of: detecting whether the second recording medium is connected to the information processing apparatus or not while the first recording medium has been connected to the information processing apparatus; and forming the same information as the information recorded in the second recording area, in the third recording area at preset timing after it is detected that the second recording medium is connected.

According to the present invention, when the connection of the second recording medium is detected, the same information as the information, which has been recorded in the foregoing second recording area, is formed in the fourth recording area, namely, the information, which has been recorded in the foregoing second recording area, is replaced, so that it is possible to update the present specific information without losing the information, which has been recorded in the second recording area to be used after the update, even if the first recording medium, in which the specific information is recorded at present, is cleared away in order to update the present specific information and it is replaced with a new recording medium. Accordingly, for example, even after the specific information is updated, it is possible to immediately start the information processing without losing the information that has been made or without newly making the information.

In one aspect of the present invention, the process of forming the same information starts the operation to form the information the same information in the third recording area when it is detected that the second recording medium is connected.

According to this aspect, when the connection of the second recording medium is detected, the operation to form the same information as the information, which has been recorded in the foregoing second recording area, in the fourth recording area, is started, so that it is possible to start the information processing by the use of the formed information after the information, which has been recorded in the second recording area, is replaced.

In another aspect of the present invention, the specific information relates to the navigation processing to facilitate the movement of a movable body.

According to this aspect, the specific information relates to the navigation processing, so that it is possible to perform the navigation processing without losing the information, which has been recorded in the second recording area.

In further aspect of the present invention, the second recording medium further comprises a fourth recording area, in which the update specific information obtained by updating the specific information on the first recording medium is recorded, and the information processing method further comprises the process of setting the information processing after the connection to be started by the use of the update specific information, which is recorded in the second recording medium, when it is detected that the second recording medium is connected.

According to this aspect, when the connection of the second recording medium is detected, the information processing after the connection is set to be started by the use of the update specific information, which has been recorded in the present second recording medium, so that it is possible to immediately start the information processing by the use of the update specific information.

DETAILED DESCRIPTION OF THE INVENTION

Preferable embodiments of the present invention will be explained with reference to the drawings below.

The embodiment applying the present invention in a navigation equipment to be loaded in a vehicle which guides the travelling of the vehicle with displaying a map or outputting a voice (hereinafter, referred to as a navigation equipment) will be explained below.

At first, an entire constitution and a schematic operation of the navigation equipment according to the embodiment will be described with reference to FIG. 1.

Figure 1:
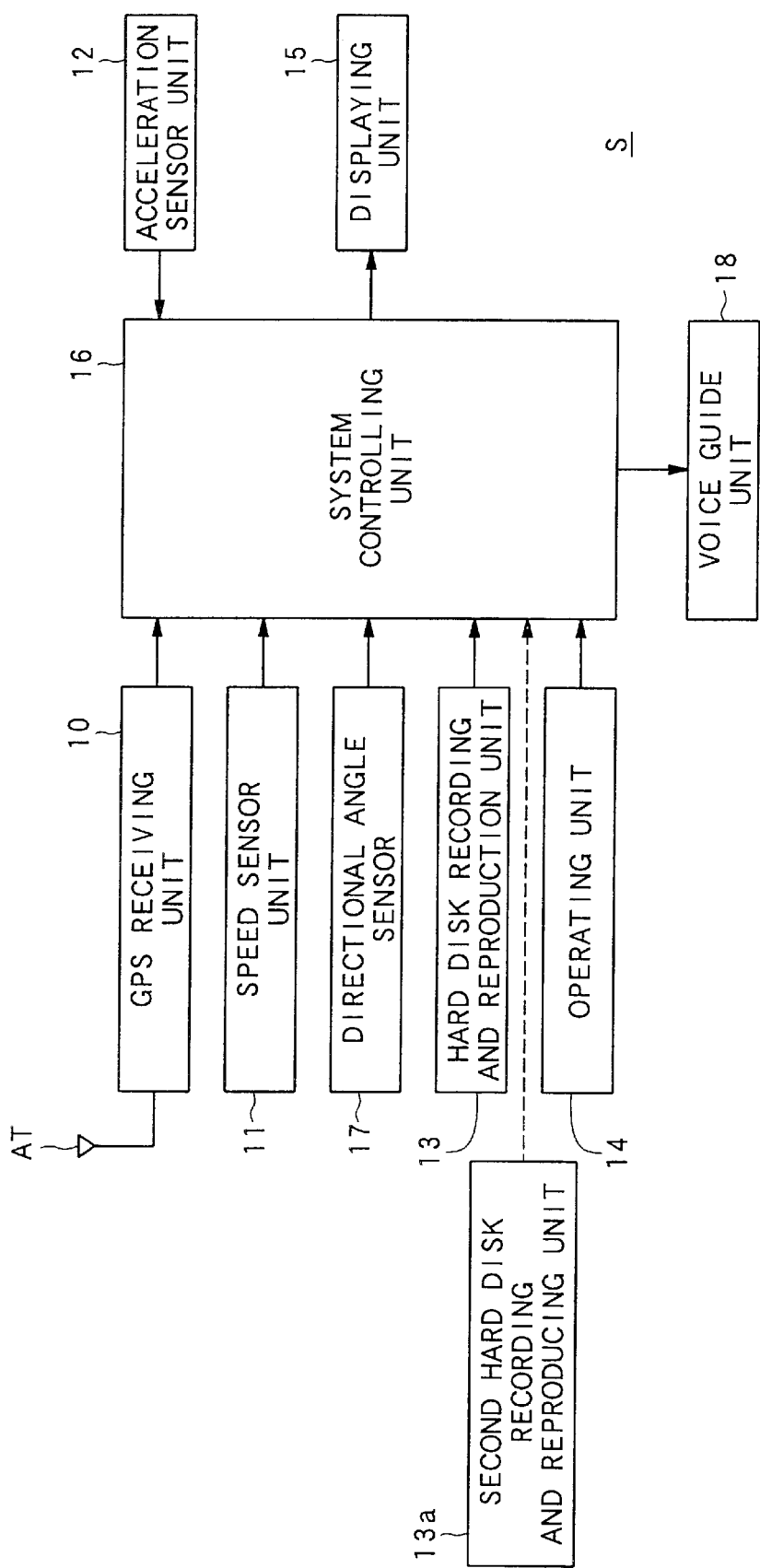
FIG. 1 is a block diagram for illustrating a schematic constitution of a navigation equipment according to a preferred embodiment.

FIG. 1 is a block diagram for illustrating a schematic constitution of a navigation equipment according to the embodiment.

As shown in FIG. 1, a navigation equipment S according to the embodiment is comprised of: a GPS (Global Positioning System) receiving unit 10, which is connected to an antenna AT; a speed sensor unit 11; an acceleration sensor unit 12; a hard disk recording and reproducing unit 13 as a first recording medium including a plurality of hard disks as a recording medium and reading and writing the information in each hard disk; an operating unit 14; a displaying unit 15; a system controlling unit 16 as a connection detecting device, a start setting device, a releasing device and a forming device; a directional angle sensor 17; and a voice guide unit 18.

Additionally, as described later, the system controlling unit 16 is capable of being connected to a second hard disk recording and reproducing unit 13a to be described later as a second recording medium including a plurality of hard disks, in which update information is recorded. The update information indicates that map information or the like, which is recorded in each hard disk included in the hard disk recording and reproducing unit 13, is updated.

In the next place, the schematic operation thereof will be explained below.

At first, the GPS receiving unit 10 receives a navigation electric wave from a plurality of satellites belonged to the GPS via the antenna AT and calculates a pseudo coordinate value at the present position and then, the GPS receiving unit 10 outputs it as the GPS data to the system controlling unit 16.

On one hand, the speed sensor 11 perceives the traveling speed of a vehicle and converts the perceived speed into the speed data in form of a pulse or a voltage to output it to the system controlling unit 16.

Alternatively, the directional angle sensor 17 is comprised of a Gyro sensor. The directional angle sensor 17 perceives an angle of direction of a vehicle, namely, a travelling direction in which the vehicle is traveling and converts the perceived angle of direction into the directional angle data in form of a pulse or a voltage to output it to the system controlling unit 16.

Further, the acceleration sensor 12 perceives the moving state of the vehicle in a vertical direction by comparing acceleration of gravity with the acceleration generated by the movement of the vehicle. Then, the acceleration sensor 12 converts the acceleration data indicating the present perceived moving state into data in form of a pulse or a voltage to output it to the system controlling unit 16.

On the other hand, the map information such as a road map or the like and other programs necessary for guiding the traveling are recorded capable of being read in a hard disk within the hard disk recording and reproducing unit 13 (hereinafter, each hard disk within the hard disk recording and reproducing unit 13 is collectively referred to as a first hard disk). In addition to this, the additional information, which has been necessary in accordance with the navigation processing by the use of the navigation equipment S and is added by the user of this navigation equipment S after the navigation equipment S is installed in a vehicle, is recorded in the hard disk within the hard disk recording and reproducing unit 13. Particularly, as described above, the additional information includes a position of a particular point where the user often visits, a passage to this particular point or a status of waiting at traffic lights on a road which is frequently used by the user (i.e., switching timing) and the music information or the like desired to be listened to by the user (not related to the navigation processing).

In this case, the present map information or the like is periodically (for example, once per year) planned to be updated to a new content in accordance with the change of the real road circumstance.

On one hand, with respect to a hard disk within the above described second hard disk recording and reproducing unit 13a (hereinafter, each hard disk within the hard disk recording and reproducing unit 13a is collectively referred to as a second hard disk) to be connected to the system controlling unit 16, in one case, no information is recorded therein (namely, the interior of the second hard disk is entirely empty) and in other case, the updated map information or the like obtained by updating the map information or the like recorded in the first hard disk is recorded.

The operating unit 14 is comprised of a remote control apparatus or the like including many keys such as various acknowledge buttons and numerical keys or the like. The operating unit 14 serves to input an order of a driver (for example, to display the vehicle traveling information).

The displaying unit 15 displays the map information outputted from the hard disk recording and reproducing unit 13 and various statuses or the like, which are necessary for guiding the traveling in the navigation equipment S.

The voice guide unit 18 outputs the travelling passage guiding information including the travelling direction of the vehicle at the next intersection and the information to be directly notified the driver in order to guide the traveling (the traffic jam information or the closed traffic information or the like) in a voice manner.

In parallel with these operations, the system controlling unit 16 includes various input-output ports (for example, a GPS reception port, a key input port and a display unit control port or the like). The system controlling unit 16 entirely controls general functions for the navigation processing including the copy processing of the additional information to be described later, causes the above traveling passage guiding information to be displayed on a map indicating a peripheral area including a present position of a vehicle in the display unit 15 as well as causes the present traveling passage guiding information or the like to be outputted from the voice guide unit 18 as a voice.

In this case, the above described position calculating unit calculates a plurality of the present pseudo positions of the vehicle on the basis of the speed data of the vehicle and the directional angle data to be outputted from the speed sensor 11 and the directional angle sensor 17. At the same time, comparing the above described pseudo coordinate value corresponding to the present position to be outputted from the GPS receiving unit 10 with one of the calculated present pseudo positions, the position calculating unit calculates the display position of a positional mark to be described later (i.e., a mark which indicates a present position of a vehicle on a map) to be displayed on the display unit 15 and further, calculates the travelling information such as a speed of the vehicle at a position other than the above present pseudo position and a travelling direction of the vehicle or the like. The position calculating unit may be provided in the interior of the system controlling unit 16 or provided in the exterior of the system controlling unit 16.

In this case, the navigation equipment S according to the embodiment includes the above described acceleration sensor 12, so that the above described position calculating unit calculates the present pseudo position of the vehicle as judging the inclination of the road and the vertical interval of the road by the use of the acceleration data, which is perceived in the acceleration sensor 12.

Therefore, it is possible to accurately calculate a present position even on a cubic interchange and a portion on which a general road and an elevated express highway are overlapped two-dimensionally, on which it is difficult to calculate the present position by merely using each data from the above described speed sensor unit 11 to perceive the dimensional position and the directional angle sensor unit 17. Further, for example, in the case that the vehicle is travelling on a mountain path or a sloping road, it becomes possible to correct an error between the real traveling distance of the vehicle and the moving distance on the map by using the inclination of a perceived road (namely, an error in the case that the above described traveling distance is longer than the moving distance on the two-dimensional map as a consequence of a fact that the vehicle moves on the inclined road) which is generated in the case of calculating the present position on the basis of each data from the above described speed sensor 11 and the directional angle sensor unit 17.

In the next place, the information copy processing of the additional information according to the embodiment will be explained with reference to FIGS. 2 to 4.

Figure 2:
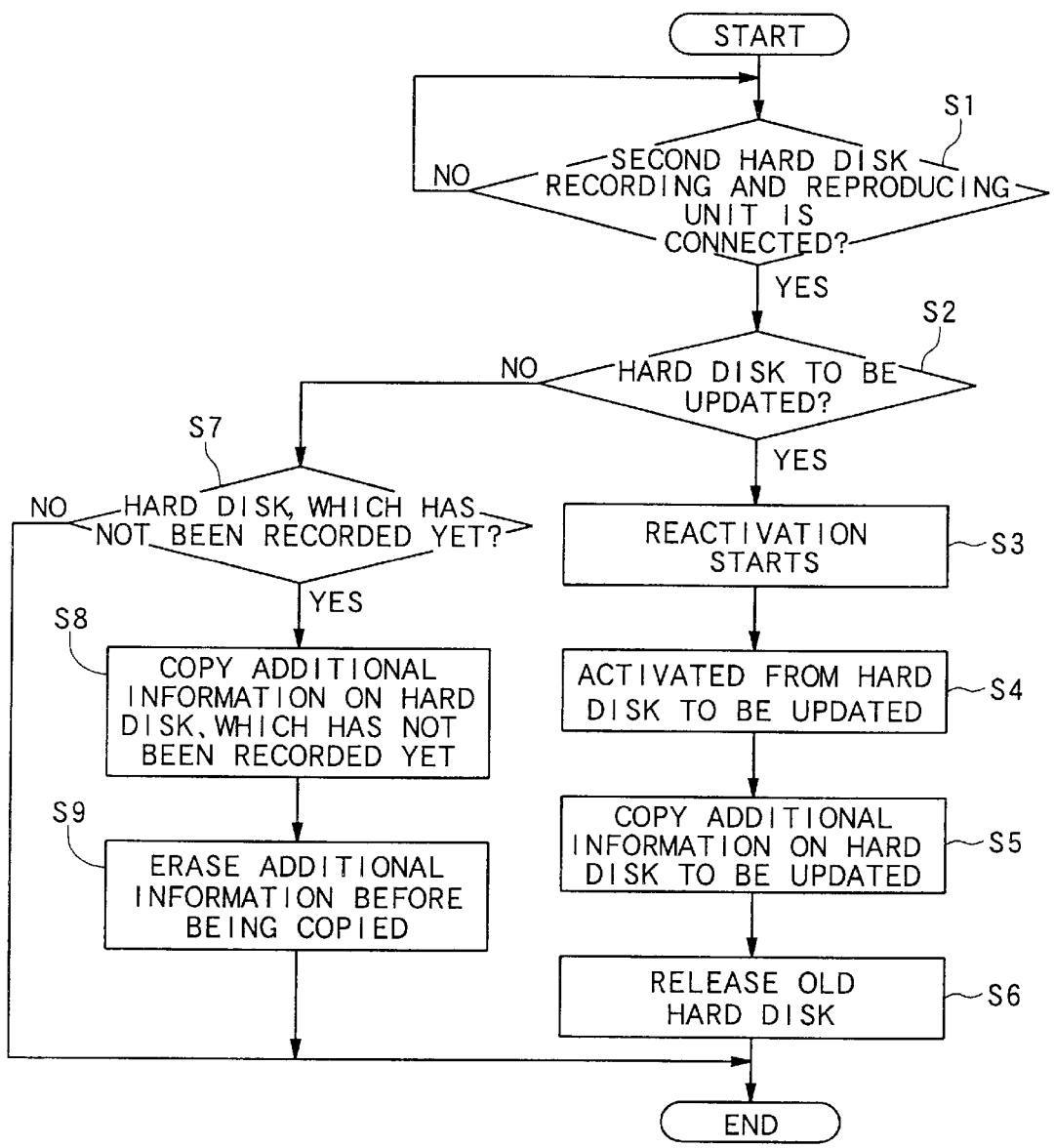
FIG. 2 is a flow chart for showing the information copying processing according to the embodiment.
Figure 3:
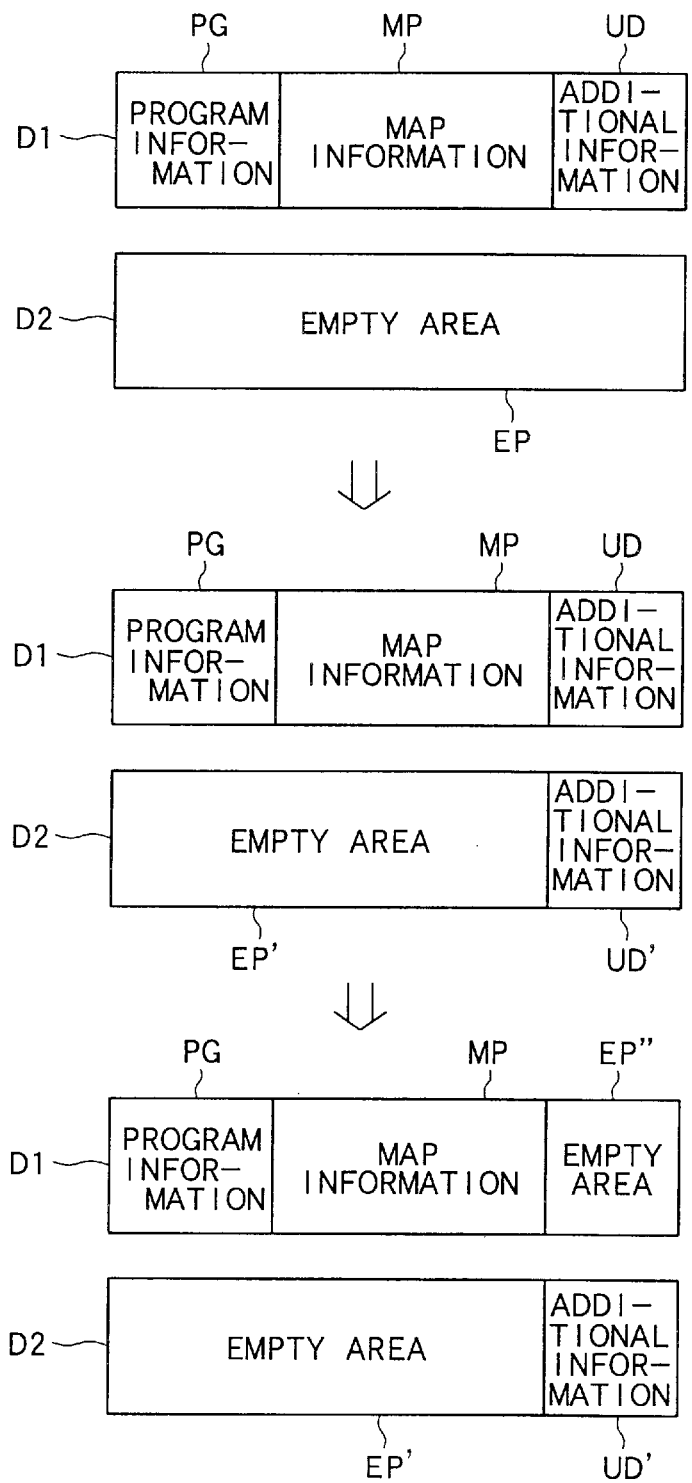
FIG. 3 is a diagram (I) for showing the alternation of a recording manner according to the embodiment.
Figure 4:
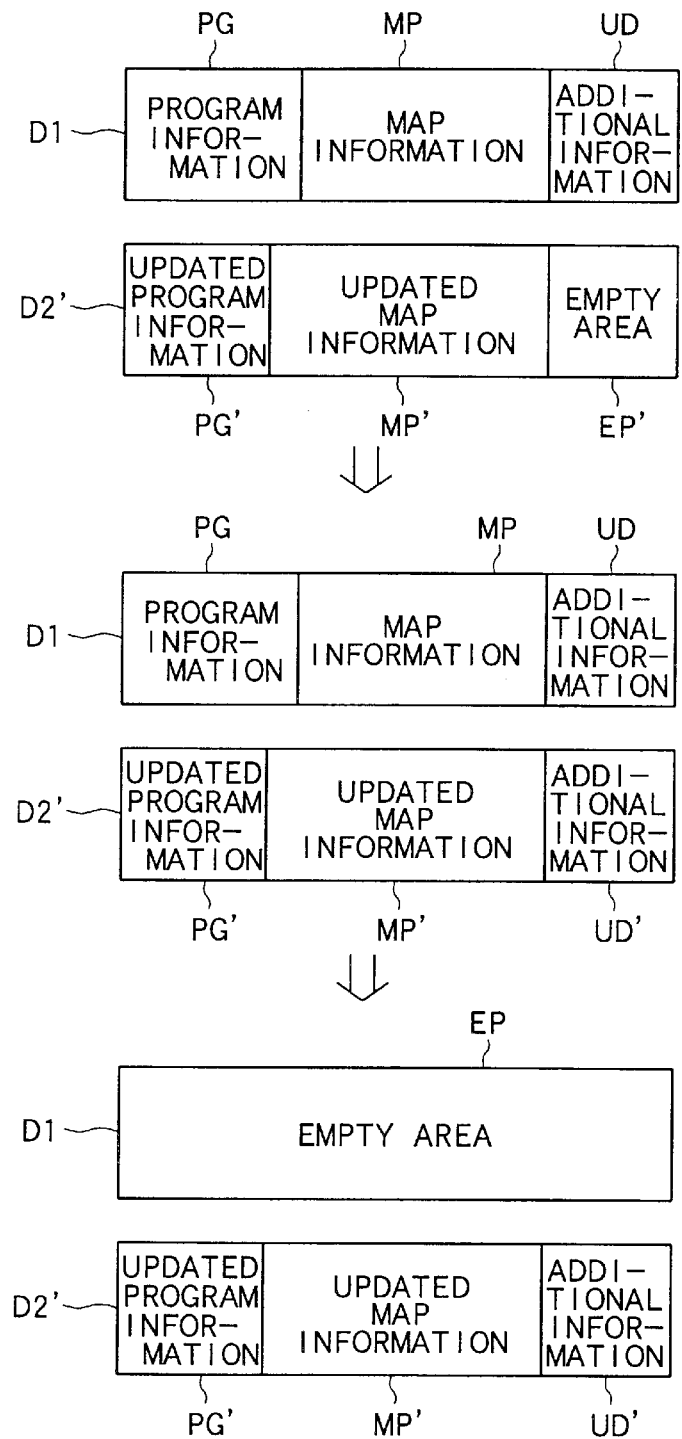
FIG. 4 is a diagram (II) for showing the alternation of a recording manner according to the embodiment.

Alternatively, FIG. 2 is a flow chart for showing the information copying processing to be performed mainly by the system controlling unit 16 and FIGS. 3 and 4 are typical views for explaining the information copying processing.

In the copying processing of the additional information according to the embodiment, at first, in the case that the hard disk recording and reproducing unit 13, in which the above described map information or the like is recorded and which includes the first hard disk, is connected to the system controlling unit 16, it is checked whether the second hard disk recording and reproducing unit 13a is normally connected to the system controlling unit 16 or not (step S1). Then, if it is not normally connected (step S1; NO), the checking operation will be repeated until it is normally connected. On the contrary, if it is normally connected (step S1; YES), then, it is determined whether the updated map information or the like obtained by updating the map information or the like, which has been already recorded in the first hard disk, in the second hard disk within the connected second hard disk recording and reproducing unit 13a or not (step S2).

Thus, if it is checked that the updated map information or the like is not recorded in the second hard disk (step S2; NO), then, it is determined whether the second hard disk is entirely empty or not (step S7).

Then, if the second hard disk is entirely empty (step S7; YES), as shown in an upper view in FIG. 3, a hard disk recording and reproducing unit 13 including the first hard disk D1 having the second recording area, in which the additional information UD added by the user is recorded in addition to the first recording area in which the map information MP and the program information PG for performing the navigation processing, and the second hard disk recording and reproducing unit 13a including the second hard disk D2, of which entire interior is decided to be an empty area EP, are connected to the system controlling unit 16 in parallel. Therefore, next, the additional information UD on the first hard disk D1 is only copied on a predetermined area on the second hard disk D2 and the additional information UD' having the same content as the additional information UD is formed on the second hard disk D2 (step S8). After the processing in this step S8 is completed, as shown in a middle view of FIG. 3, although contents of the original hard disk D1 is remained, the additional information UD' is newly recorded on the second hard disk D2 and a remaining area of the second hard disk D2 becomes an empty area EP'.

Alternatively, in the determination in the step S7, if it is not determined that the interior of the second hard disk is entirely empty (step S7; NO), it is determined that it is not possible to perform the copying processing of the additional information UD according to the embodiment. After that, the processing to display that it is not possible to perform the copying processing of the additional information UD on the display unit 15 is performed to terminate the processing.

If the additional information UD' is copied and recorded on the second hard disk D2, then, the additional information UD is erased from the second recording area on the original hard disk D1, in which the original additional information UD is recorded (step S9), so that the copying processing of the additional information UD according to the embodiment is completed. After the processing of this step S9 is performed, as shown in a lower view of FIG. 3, the second recording area on the original hard disk D1, in which the original additional information UD has been recorded, becomes an empty area EP" to be used for other purposes in the future.

On one hand, according to the above described step S2, in the case that the above described updated map information or the like is recorded on the second hard disk within the connected second hard disk recording and reproducing unit 13a (step S2; YES), as shown in an upper view of FIG. 4, a hard disk recording and reproducing unit 13 including the first hard disk D1, in which the above described map information MP, the program information PG and the additional information UD are recorded, and the second hard disk recording and reproducing unit 13a having a third recording area, in which the updated map information MP' and the updated program information PG' obtained by updating the map information MP and the program information PG, respectively, are recorded, as well as including the second hard disk D2', of which remaining area is decided to be an empty area EP' as a fourth recording area, are connected to the system controlling unit 16 in parallel. Therefore, the processing is started to reactivate the entire of the navigation equipment S (i.e., initiate) (step S3) and the reactivation thereof is performed by using the above described updated map information MP' and the updated program information PG' (step S4).

Then, after the reactivation, the additional information UD on the first hard disk D1 is only copied on the empty area EP' on the second hard disk D2', so that the additional information UD' having the same content as the additional information UD is formed on the empty area EP' (step S5). After the processing of this step S5 is terminated, as shown in a middle view of FIG. 4, although a content of the original hard disk D1 is remained, the additional information UD' is newly recorded on the second hard disk D2' in addition to the updated map information MP' and the updated program information PG'.

If the additional information UD' is copied and recorded on the second hard disk D2', then, the entire of the first hard disk D1, in which the original additional information UD is recorded, is released (namely, the entire thereof is defined again to be an area capable of freely recording and reproducing the information) (step 6), so that the copying processing of the additional information UD according to the embodiment will be completed.

After the processing in this step S6 is performed, as shown in a lower view of FIG. 4, the entire original hard disk D1, in which the original additional information UD has been recorded, becomes the empty area EP to be used for other purposes in the future. Hereafter, the hard disk recording and reproducing unit 13 may be detached from the system controlling unit 16 or the hard disk recording and reproducing unit 13 may be used for other purposes by remaining it as it is.

Specifically, the processing to form the additional information UD' in the above described step S5 or S8 may be started, for example, from timing when the second hard disk recording and reproducing unit 13a has been connected to the system controlling unit 16 or the processing to form the additional information UD' in the above described step S5 or S8 may be performed just before the second hard disk recording and reproducing unit 13 is detached from the system controlling unit 16. Alternatively, the processing to form the additional information UD' in the above described step S5 or S8 may be constituted so as to be started from timing designated by the user. Further, the processing to form the additional information UD' in the above described step S5 or S8 may be constituted so as to be performed before the information amount of the empty area EP or the empty area EP' attains to the information amount of the additional information UD.

Alternatively, just before the processing to form the additional information UD' is started, the start of the processing may be displayed by using the display unit 15 or the voice guide unit 18 in order to cause the user to identify and check the start.

Further, the releasing processing of the above described step S6 may be performed before the copying processing of the step S5.

Furthermore, for example, the releasing processing in this step S6 may be started from timing when the second hard disk recording and reproducing unit 13a has been connected to the system controlling unit 16 or it may be constituted so as to be started from timing designated by the user. Further, it may be constituted so as to be started from timing when the copying processing in the step S5 is completed.

Alternatively, just before the releasing processing is started, the start of the releasing processing may be displayed by using the display unit 15 or the voice guide unit 18 in order to cause the user to identify and check the start.

As described above, according to the copying processing or the like of the additional information UD of the embodiment, when the same information as the additional information UD is formed on the second hard disk recording and reproducing unit 13a, of which connection is detected, namely, when the replacement of the additional information UD is completed, an area in which the map information MP or the like in the first hard disk D1 is recorded, is released as the empty area EP, so that it is possible to enable recording other information or reproducing other information in the first hard disk D1 without imposing a burden on the user.

Alternatively, according to the updating processing or the like of the additional information UD, when the connection of the second hard disk recording and reproducing unit 13a is detected, the same information as the additional information UD is formed on the second hard disk D2 or the second hard disk D2', namely, the additional information UD is replaced, so that it is possible to update the map information MP or the like without losing the additional information UD to be used after updating, even if the first hard disk D1, in which the map information MP or the like is recorded at the present, is removed in order to update the map information MP or the like, and it is replaced with a new hard disk recording and reproducing unit.

Alternatively, since the second hard disk D2 is connected with being capable of freely recording the information, it is possible to completely replace the entire of the additional information UD.

Further, the additional information UD is replaced in the second hard disk D2' to be immediately used just after updating, in which the updated map information MP' is recorded, so that it is possible to start the navigation processing by using the map information MP' and the additional information UD just after the replacement.

Furthermore, since the navigation processing after the connection is set to be started by the use of the map information MP' when the second hard disk D2', in which the map information MP' or the like is recorded, is connected, it is possible to immediately and easily update the map information or the like, which is used for the navigation processing.

According to the above described embodiment, the case that the hard disk is used as the recording medium is explained. However, in addition to this, if the recording medium is a recording medium capable of being written, the present invention may be applied to, for example, the case that a content of a semiconductor memory is updated.

Additionally, according to the above described embodiment, the case that the present invention is applied to the navigation equipment by the use of the map information or the like is explained. However, in addition to this, the present invention may be applied to, for example, the case that a recording medium, in which new other musical compositions are recorded, is additionally connected to a music reproducing apparatus provided with a recording medium, in which a plurality of musical compositions are stored and which is provided with a recording medium capable of being written, so that the musical composition is updated.

Further, a program corresponding to a flow chart shown in FIG. 2 is recorded in a flexible disk or a hard disk as an information recording medium. Then, the program is read out by a general purpose computer such as a microcomputer or the like to be executed, so that it is also possible to function the general computer as the above described system controlling unit 16.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-400524, 2000-400525 filed on Dec. 28, 2000 including the specification, claims, drawings and summary is incorporated herein by reference in its entirety.

What is claimed is:

1. An information processing apparatus capable of connecting the both of a first recording medium and a second recording medium, said first recording medium comprising a first recording area and a second recording area, said second recording medium comprising a third recording area and a fourth recording area, said first recording area in which specific information to be used for information processing is recorded and the specific information is not capable of being erased under a predetermined condition, said second recording area capable of recording the information on the basis of a user's instruction, said third recording area in which update specific information used for the information processing and obtained by updating the specific information is recorded and the update specific information is not capable of being erased under a predetermined condition, said fourth recording area capable of recording the information on the basis of a user's instruction, said information processing apparatus comprising:

a connection detecting device for detecting whether the second recording medium is connected to the information processing apparatus or not while the first recording medium has been connected to the information processing apparatus; and a releasing device for allowing the specific information recorded in the first recording area to be erased at preset timing after it is detected that the second recording medium is connected, and for releasing the first recording area as an empty area after the specific information is erased.

2. The information processing apparatus according to claim 1, further comprising a forming device for forming the same information as the information recorded in the second recording area, in the fourth recording area;

wherein the forming device starts the operation to form the same information in the fourth recording area when it is detected that the second recording medium is connected, and the releasing device starts the operation to release the first recording area after the specific information is erased as an empty area after the operation to form the same information is completed.

3. The information processing apparatus according to claim 1, wherein the specific information relates to the navigation processing to facilitate the movement of a movable body.

4. The information processing apparatus according to claim 1, further comprising a start setting device which sets the information processing after the connection to be started by the use of the update specific information, which is recorded in the second recording medium, when it is detected that the second recording medium is connected.

5. An information recording medium, in which a program for information processing is recorded capable of being read by a computer, which is included in an information processing apparatus capable of connecting the both of a first recording medium and a second recording medium, said first recording medium comprising a first recording area and a second recording area, said second recording medium comprising a third recording area and a fourth recording area, said first recording area in which specific information to be used for information processing is recorded and the specific information is not capable of being erased under a predetermined condition, said second recording area capable of recording the information on the basis of a user's instruction, said third recording area in which update specific information used for the information processing and obtained by updating the specific information is recorded and the update specific information is not capable of being erased under a predetermined condition, said fourth recording area capable of recording the information on the basis of a user's instruction, wherein said program causes said computer to function as:

a connection detecting device for detecting whether the second recording medium is connected to the information processing apparatus or not while the first recording medium has been connected to the information processing apparatus; and a releasing device for allowing the specific information recorded in the first recording area to be erased at preset timing after it is detected that the second recording medium is connected, and for releasing the first recording area as an empty area after the specific information is erased.

6. The information recording medium, according to claim 5, wherein said program further causes said computer to function as a forming device for forming the same information as the information recorded in the second recording area, in the fourth recording area, the forming device starts the operation to form the same information in the fourth recording area when it is detected that the second recording medium is connected, and the releasing device starts the operation to release the first recording area after the specific information is erased as an empty area after the operation to form the same information is completed.

7. The information recording medium, according to claim 5, wherein the specific information relates to the navigation processing to facilitate the movement of a movable body.

8. The information recording medium, according to claim 5, wherein said program further causes said computer to function as a start setting device which sets the information processing after the connection to be started by the use of the update specific information, which is recorded in the second recording medium, when it is detected that the second recording medium is connected.

9. An information processing method of performing information processing in an information processing apparatus capable of connecting the both of a first recording medium and a second recording medium, said first recording medium comprising a first recording area and a second recording area, said second recording medium comprising a third recording area and a fourth recording area, said first recording area in which specific information to be used for information processing is recorded and the specific information is not capable of being erased under a predetermined condition, said second recording area capable of recording the information on the basis of a user's instruction, said third recording area in which update specific information used for the information processing and obtained by updating the specific information is recorded and the update specific information is not capable of being erased under a predetermined condition, said fourth recording area capable of recording the information on the basis of a user's instruction, said information processing method comprising the processes of:

detecting whether the second recording medium is connected to the information processing apparatus or not while the first recording medium has been connected to the information processing apparatus;

allowing the specific information recorded in the first recording area to be erased at preset timing after it is detected that the second recording medium is connected; and releasing the first recording area as an empty area after the specific information is erased.

10. The information processing method according to claim 9, further comprising the process of forming the same information as the information recorded in the second recording area, in the fourth recording area;

wherein the process of forming the same information starts the operation to form the same information in the fourth recording area when it is detected that the second recording medium is connected, and the process of releasing the first recording area starts the operation to release the first recording area after the specific information is erased as an empty area after the operation to form the same information is completed.

11. The information processing method according to claim 9, wherein the specific information relates to the navigation processing to facilitate the movement of a movable body.

12. The information processing method according to claim 9, further comprising the process of setting the information processing after the connection to be started by the use of the update specific information, which is recorded in the second recording medium, when it is detected that the second recording medium is connected.

13. An information processing apparatus capable of connecting the both of a first recording medium and a second recording medium, said first recording medium comprising a first recording area and a second recording area, said second recording medium comprising at least a third recording area, said first recording area in which specific information to be used for information processing is recorded, said second recording area capable of recording the information on the basis of a user's instruction, said third recording area capable of recording the information on the basis of a user's instruction, said information processing apparatus comprising:

a connection detecting device for detecting whether the second recording medium is connected to the information processing apparatus or not while the first recording medium has been connected to the information processing apparatus; and a forming device for forming the same information as the information recorded in the second recording area, in the third recording area at preset timing after it is detected that the second recording medium is connected.

14. The information processing apparatus according to claim 13, wherein the forming device starts the operation to form the information the same information in the third recording area when it is detected that the second recording medium is connected.

15. The information processing apparatus according to claim 13, wherein the specific information relates to the navigation processing to facilitate the movement of a movable body.

16. The information processing apparatus according to claim 13, wherein the second recording medium further comprises a fourth recording area, in which the update specific information obtained by updating the specific information on the first recording medium is recorded, and the information processing apparatus further comprises a start setting device which sets the information processing after the connection to be started by the use of the update specific information, which is recorded in the second recording medium, when it is detected that the second recording medium is connected.

17. An information recording medium, in which a program for information processing is recorded capable of being read by a computer, which is included in an information processing apparatus capable of connecting the both of a first recording medium and a second recording medium, said first recording medium comprising a first recording area and a second recording area, said second recording medium comprising at least a third recording area, said first recording area in which specific information to be used for information processing is recorded, said second recording area capable of recording the information on the basis of a user's instruction, said third recording area capable of recording the information on the basis of a user's instruction, said program causing said computer to function as:

a connection detecting device for detecting whether the second recording medium is connected to the information processing apparatus or not while the first recording medium has been connected to the information processing apparatus; and a forming device for forming the same information as the information recorded in the second recording area, in the third recording area at preset timing after it is detected that the second recording medium is connected.

18. The information recording medium, according to claim 17, wherein the forming device starts the operation to form the information the same information in the third recording area when it is detected that the second recording medium is connected.

19. The information recording medium, according to claim 17, wherein the specific information relates to the navigation processing to facilitate the movement of a movable body.

20. The information recording medium, according to claim 17 wherein the second recording medium comprises a fourth recording area, in which the update specific information obtained by updating the specific information on the first recording medium is recorded, and said program further causes said computer to function as a start setting device which sets the information processing after the connection to be started by the use of the update specific information, which is recorded in the second recording medium, when it is detected that the second recording medium is connected.

21. An information processing method of performing information processing in an information processing apparatus capable of connecting the both of a first recording medium and a second recording medium, said first recording medium comprising a first recording area and a second recording area, said second recording medium comprising at least a third recording area, said first recording area in which specific information to be used for information processing is recorded, said second recording area capable of recording the information on the basis of a user's instruction, said third recording area capable of recording the information on the basis of a user's instruction, said information processing method comprising the processes of:

detecting whether the second recording medium is connected to the information processing apparatus or not while the first recording medium has been connected to the information processing apparatus; and forming the same information as the information recorded in the second recording area, in the third recording area at preset timing after it is detected that the second recording medium is connected.

22. The information processing method according to claim 21,
wherein the process of forming the same information starts the operation to form the information the same information in the third recording area when it is detected that the second recording medium is connected.

23. The information processing method according to claim 21,
wherein the specific information relates to the navigation processing to facilitate the movement of a movable body.

24. The information processing method according to claim 21,
wherein the second recording medium further comprises a fourth recording area, in which the update specific information obtained by updating the specific information on the first recording medium is recorded, and the information processing method further comprises the process of setting the information processing after the connection to be started by the use of the update specific information, which is recorded in the second recording medium, when it is detected that the second recording medium is connected.

* * * * *